(No Model.)

R. GROARK.
PIPE COUPLING.

No. 403,884.                    Patented May 21 1889.

Section a-b

Section c-d.

Witnesses.
Walter E. Ward
John W. Fisher

Inventor
Richard Groark.
per
Frederick W. Cameron.

Attorney

UNITED STATES PATENT OFFICE.

RICHARD GROARK, OF GREENBUSH, NEW YORK, ASSIGNOR OF ONE-FOURTH TO WILLIAM H. HEPINSTALL, OF SAME PLACE.

PIPE-COUPLING.

SPECIFICATION forming part of Letters Patent No. 403,884, dated May 21, 1889.

Application filed January 17, 1889. Serial No. 296,617. (No model.)

*To all whom it may concern:*

Be it known that I, RICHARD GROARK, a citizen of the United States, residing at Greenbush, in the county of Rensselaer and State of New York, have invented a new and useful Pipe-Coupling, of which the following is a specification.

My invention relates to devices for coupling pipes in car-heating apparatus; and the object of my invention is to provide a coupling particularly adapted for connecting the steam-pipes between the cars in a railway-car steam-heating apparatus and so arranged that it can be operated quickly and automatically. I attain this object by the mechanism illustrated in the accompanying drawings, in which—

Figure 1:
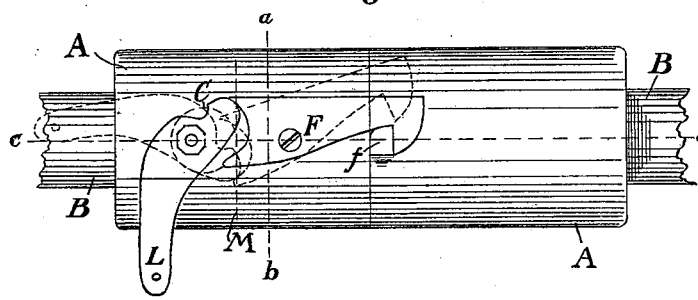
Figure 2:
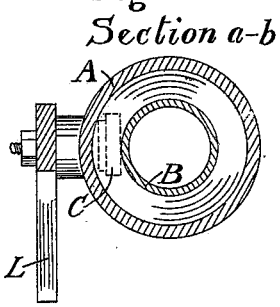
Figure 3:
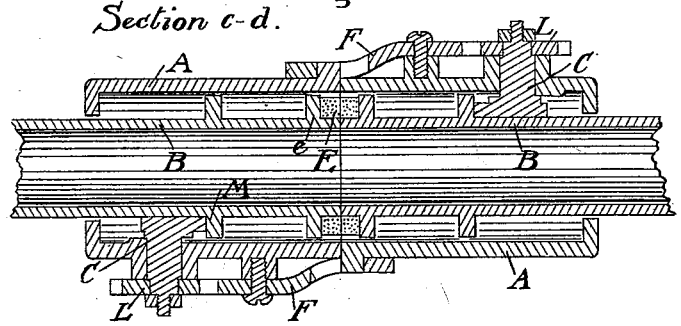
Figure 4:
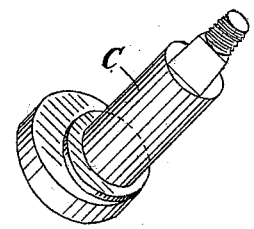

Figure 1 is an elevation showing the manner of locking and unlocking the coupling. Fig. 2 is a section along the line *a b* of Fig. 1. Fig. 3 is a longitudinal section, and Fig. 4 is the cam-bolt C.

Similar letters refer to similar parts throughout the several views.

My coupler is composed of two sections, each section provided with a coupling-sleeve pipe, B, gasket E, bolt C, and means for connecting and operating them. The pipe B is attached to the end of a steam-pipe, and is provided at the end opposite from the one connected to the pipe with a gasket, E, composed of suitable material—rubber or metal. The gasket E fits closely about the pipe B, and is in contact with the ring *e*, cast on the surface of the pipe B. On the surface of the pipe B, a short distance from the ring *e*, is cast a ring, M.

The coupling-sleeve A, into which the pipe B is placed, is of sufficient diameter to allow the rings *e* and M to pass within it easily, and is provided with a bolt, C, passing through the side of the coupling-sleeve. The bolt C has on its end, placed within the barrel A, a head so formed that a part extends to a greater distance from the shank on one side than on the other, the bolt-shank not being placed in the center of the head, thus arranged in such a manner that as the bolt is revolved the head acts against the ring M as a cam. When the pipe B is placed into the coupling-sleeve A, the ring M comes into contact with the bolt-head of bolt C, and when the bolt is turned so that the smaller part of the head is in contact with the ring M, the gasket E is flush with the end of the coupler, or, rather, with the end of one section of the coupler. By turning the bolt C the pipe B will be forced forward, pressing the gasket tightly against the gasket on the other section of the coupler, which last-mentioned gasket is also forced in like manner in contact with the first-mentioned gasket, thus making a close-fitting coupling, preventing the escape of steam, and making a very firm and secure connection.

For the purpose of locking the coupling, I place on each coupling-sleeve a lug, *f*, and a latch-hook, F, movable on a bolt. One end of the latch-hook F has a recess into which the end of a lever, L, engages. The lever L is attached to the bolt C, and operates that bolt, and is so arranged in relation to latch-hook F that when it occupies the position shown by full lines in Fig. 1 the coupling is locked, the latch being hooked over the lug *f* on the coupling-sleeve opposite the one on which the latch-hook is pivoted. When the lever L is placed in the position shown by the dotted lines in Fig. 1, the latch-hook is raised by the action of the lever on the end of the latch-hook, and the coupling is unlocked. The lever L being attached to the bolt C when it is pressed downward, locking the coupling, it forces the pipe B forward and makes the connection perfect. The lever L has its end opposite that which is in contact with the latch-hook attached in any suitable manner, by chain or otherwise, to the railway-car or its appendages, and so adjusted that as the cars are separated the chain, when drawn taut, will draw the lever to the position shown by the dotted lines in Fig. 1, thus unlocking the coupling, and the parts will separate. To couple the pipes, it is simply necessary to bring the two sections together and force down the levers L L, and the pipes will be securely and positively united.

My pipe-coupling is simple in its construction and operation, and performs its function in a positive and satisfactory manner.

What I claim as my invention, and desire to secure by Letters Patent, is—

In a pipe-coupling, consisting of two similar sections, the combination of a pipe provided with a gasket near one end, and also provided with an annular flange, a coupling-sleeve enveloping said pipe, a shaft passing through said coupling-sleeve provided with a cam operating in contact with said annular flange, a latch-hook pivoted to said coupling-sleeve, one end thereof engaging with a lug attached to the coupling-sleeve on the opposite section, the other end of said latch-hook provided with a recess in contact with one end of a cam-lever securely attached to the said cam-shaft, all substantially as described.

RICHARD GROARK.

Witnesses:
WILLIAM H. HEPINSTALL,
FREDERICK W. CAMERON.